(12) United States Patent
Li et al.

(10) Patent No.: US 12,037,495 B2
(45) Date of Patent: Jul. 16, 2024

(54) FLAME RETARDANT LOW HARDNESS MATERIAL

(71) Applicant: Kitagawa Industries Co., Ltd., Inazawa (JP)

(72) Inventors: Guowei Li, Kasugai (JP); Shinya Washino, Kasugai (JP)

(73) Assignee: Kitagawa Industries Co., Ltd., Tokyo (JP)

( * ) Notice: Subject to any disclaimer, the term of this patent is extended or adjusted under 35 U.S.C. 154(b) by 616 days.

(21) Appl. No.: 17/292,393

(22) PCT Filed: May 20, 2019

(86) PCT No.: PCT/JP2019/019857
§ 371 (c)(1),
(2) Date: May 7, 2021

(87) PCT Pub. No.: WO2020/095468
PCT Pub. Date: May 14, 2020

(65) Prior Publication Data
US 2022/0010135 A1   Jan. 13, 2022

(30) Foreign Application Priority Data
Nov. 8, 2018  (JP) ................. 2018-210601

(51) Int. Cl.
*C08L 91/00* (2006.01)
*C09K 21/12* (2006.01)

(52) U.S. Cl.
CPC .............. *C08L 91/00* (2013.01); *C09K 21/12* (2013.01); *C08L 2201/02* (2013.01); *C08L 2205/03* (2013.01); *C08L 2205/06* (2013.01); *C08L 2207/322* (2013.01)

(58) Field of Classification Search
CPC .............. C08L 91/00; C08L 2207/322; C08L 2205/03; C08L 2205/06; C08L 2201/02; C09K 21/12
USPC ........................................................ 524/100
See application file for complete search history.

(56) References Cited

U.S. PATENT DOCUMENTS 6,255,371 B1 * 7/2001 Schlosser ............... C09K 21/12
524/133

FOREIGN PATENT DOCUMENTS

| CN | 103897324 A | 7/2014 |
|---|---|---|
| JP | 2013-104046 | 5/2013 |
| WO | WO 2015/141708 | 9/2015 |

\* cited by examiner

*Primary Examiner* — Hui H Chin
(74) *Attorney, Agent, or Firm* — Thorpe North & Western

(57) ABSTRACT

A flame retardant low hardness material of the present technology contains: 100 parts by mass of a styrene-based elastomer; from 500 to 807 parts by mass of a process oil composed of a petroleum-based hydrocarbon; from 200 to 494 parts by mass of a melamine polyphosphate-based flame retardant; from 200 to 494 parts by mass of a metal phosphinate-based flame retardant; from 4 to 6 parts by mass of a fluorine-based resin; and from 56 to 93 parts by mass of a carbon filler, wherein an asker C hardness is 30 or less.

4 Claims, 1 Drawing Sheet

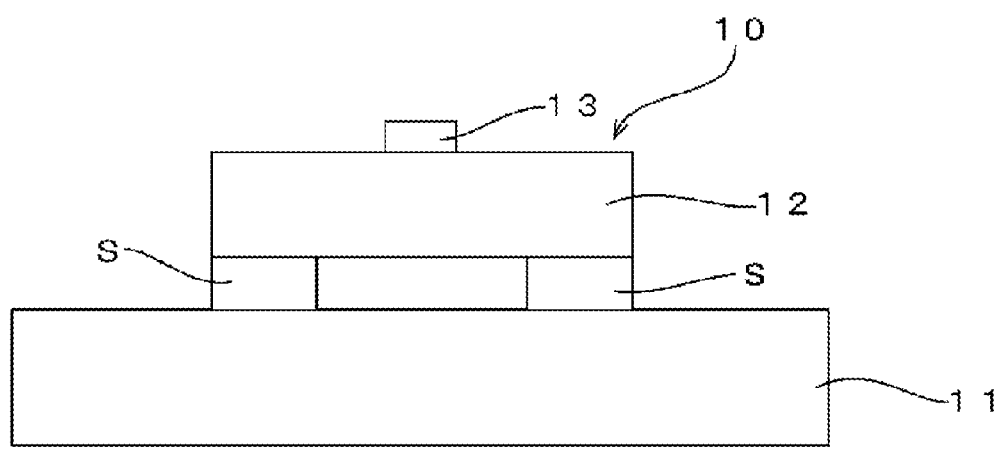

FLAME RETARDANT LOW HARDNESS MATERIAL

TECHNICAL FIELD

The present technology relates to a flame retardant low hardness material.

BACKGROUND ART

Soft low hardness materials have been utilized for measures against vibration and impact in electronic devices and the like (see, for example, Japan Unexamined Patent Publication No. 2013-104046). This type of low hardness material is often used for applications that require flame retardancy, and therefore a flame retardant is usually added in the low hardness material. Incidentally, as the flame retardant, non-halogen flame retardants for reduction in environmental impact have been used.

SUMMARY

The present technology is to provide a flame retardant low hardness material having excellent low hardness. That is, the present technology provides:

<1> A flame retardant low hardness material containing:
100 parts by mass of a styrene-based elastomer;
from 500 to 807 parts by mass of a process oil composed of a petroleum-based hydrocarbon;
from 200 to 494 parts by mass of a melamine polyphosphate-based flame retardant;
from 200 to 494 parts by mass of a metal phosphinate-based flame retardant;
from 4 to 6 parts by mass of a fluorine-based resin; and
from 56 to 93 parts by mass of a carbon filler, wherein an Asker C hardness is 30 or less.

<2> The flame retardant low hardness material according to above <1>,
wherein
a content of the process oil is from 576 to 807 parts by mass;
a ratio (a/(b1+b2)) of a mass (a) of the process oil to a total mass (b1+b2) of the melamine polyphosphate-based flame retardant and the metal phosphinate-based flame retardant is 0.79 or greater; and
the asker C hardness is 20 or less.

<3> The flame retardant low hardness material according to <1> or <2>,
wherein
a content of the melamine polyphosphate-based flame retardant is from 245 to 494 parts by mass; and
a content of the metal phosphinate-based flame retardant is from 245 to 494 parts by mass.

According to the present technology, a flame retardant low hardness material having excellent low hardness can be provided.

BRIEF DESCRIPTION OF DRAWINGS

The Drawing is an explanatory diagram schematically illustrating a configuration of a vibration testing device.

DETAILED DESCRIPTION

The flame retardant low hardness material of the present embodiment mainly contains a styrene-based elastomer, a process oil composed of a petroleum-based hydrocarbon, a melamine polyphosphate-based flame retardant, a metal phosphinate-based flame retardant, a fluorine-based resin, and a carbon filler.

The styrene-based elastomer is a base polymer of the flame retardant low hardness material. A styrene-based elastomer having thermoplasticity, appropriate elasticity, and the like is preferably used. Examples of the styrene-based elastomer include hydrogenated styrene-isoprene-butadiene block copolymers (SEEPS), styrene-isoprene-styrene block copolymers (SIS), styrene-isobutylene copolymers (SIBS), styrene-butadiene-styrene block copolymers (SBS), styrene-ethylene-propylene block copolymers (SEP), styrene-ethylene-butylene-styrene block copolymers (SEBS), and styrene-ethylene-propylene-styrene block copolymers (SEPS). These may be used alone or in combination of two or more types thereof.

The styrene-based elastomer is preferably obtained by hydrogenating a block copolymer composed of a polymer block A containing at least two vinyl aromatic compounds as a main component and a polymer block B containing at least one conjugated diene compound.

Examples of the vinyl aromatic compound include styrene, α-methylstyrene, o-methylstyrene, m-methylstyrene, p-methylstyrene, 1,3-dimethylstyrene, vinylnaphthalene, and vinylanthracene. Among these, styrene and α-methylstyrene are preferable. One type of aromatic vinyl compound may be used alone, or two or more types thereof may be used in combination.

The content of the vinyl aromatic compound in the styrene-based elastomer is preferably from 5 to 75 mass %, and more preferably from 5 to 50 mass %.

Examples of the conjugated diene compound include butadiene, isoprene, 2,3-dimethyl-1,3-butadiene, 1,3-pentadiene, and 1,3-hexadiene. One type of conjugated diene compound may be used alone, or two or more types thereof may be used in combination. Among these, the conjugated diene compound is preferably at least one type selected from the group consisting of isoprene and butadiene, and more preferably a mixture of isoprene and butadiene.

In the styrene-based elastomer, 50% or greater of carbon-carbon double bonds derived from the conjugated diene compound of the polymer block B is preferably hydrogenated, 75% or greater of carbon-carbon double bonds are more preferably hydrogenated, and 95% or greater of carbon-carbon double bonds are particularly preferably hydrogenated.

The styrene-based elastomer is only required to contain at least one of each of the polymer block A and the polymer block B, but preferably contains two or more polymer blocks A and one or more polymer blocks B from the perspective of heat resistance, mechanical properties, and the like. The bonding manner of the polymer block A and the polymer block B may be linear, branched, or any combination thereof, but when the polymer block A is represented by A and the polymer block B is represented by B, a triblock structure represented by A-B-A, a multiblock copolymer represented by (A-B)n or (A-B)n-A (where n represents an integer of 2 or greater), and the like can be exemplified. Among these, a triblock structure represented by A-B-A is particularly preferable from the perspective of heat resistance, mechanical properties, handling properties, and the like.

The weight average molecular weight of the styrene-based elastomer is preferably from 80000 to 400000, and more preferably from 100000 to 350000. Note that the weight average molecular weight in the present specification is a weight average molecular weight measured by gel permeation chromatography (GPC) calibrated with polystyrene standard. The measurement conditions for the weight average molecular weight are as follows.

<Measurement Conditions>

GPC: LC Solution (available from Shimadzu Corporation)

Detector: differential refractometer RID-10A (available from Shimadzu Corporation)

Column: two columns (TSKgelG4000Hx1) connected in series (available from Tosoh Corporation)

Guard column: TSKguardcolumnHx1-L (available from Tosoh Corporation)

Solvent: tetrahydrofuran

Temperature: 40° C.

Flow rate: 1 ml/min

Concentration: 2 mg/ml

The styrene-based elastomer is particularly preferably SEEPS. As a commercially available product of SEEPS, for example, SEPTON (registered trademark) 4033, 4044, 4055, 4077, and 4099, available from Kuraray Co., Ltd. can be used. Among these, as SEEPS, SEPTON (registered trademark) 4055 (weight average molecular weight: 270000) is particularly preferable from the perspective of mixing properties or miscibility with other materials, formability, and the like. The styrene-based elastomer may be used alone or in combination of two or more types thereof.

The process oil has a function of softening a styrene-based elastomer (for example, SEEPS), for example, and is formed from a petroleum-based hydrocarbon. The petroleum-based hydrocarbon is not particularly limited as long as the present technology is not impaired, but, for example, a paraffin-based hydrocarbon compound is preferable. That is, the process oil is preferably a paraffin-based process oil. As the paraffin-based process oil, a paraffin-based process oil having a molecular weight of 400 to 800 is preferable. Further, the process oil is a high viscosity oil having a kinematic viscosity at 40° C. of 380 mm²/sec or greater. Specific examples of the paraffin-based process oil include "Diana Process Oil PW-380 (molecular weight: 750, kinematic viscosity at 40° C.: 380 mm²/sec)" (available from Idemitsu Kosan Co., Ltd.). The process oil may be used alone or in combination of two or more types thereof.

In the flame retardant low hardness material, the blended amount of the process oil per 100 parts by mass of the styrene-based elastomer is preferably from 500 to 807 parts by mass, and preferably from 576 to 807 parts by mass.

The melamine polyphosphate-based flame retardant is an addition reaction product formed from condensed phosphoric acid such as pyrophosphoric acid, polyphosphoric acid, polymetaphosphoric acid, and an aminotriadine compound such as melamine, guanamine, benzo guanamine and/or a condensate thereof (melam, melem, and melon, for example).

Examples of commercially available melamine polyphosphate-based flame retardants include trade name "MPP-A" (melamine polyphosphate) available from Sanwa Chemical Co., Ltd. The melamine polyphosphate-based flame retardant may be used alone or in combination of two or more types thereof.

In the flame retardant low hardness material, the blended amount of the melamine polyphosphate-based flame retardant per 100 parts by mass of the styrene-based elastomer is from 200 to 494 parts by mass, and preferably from 245 to 494 parts by mass.

The metal phosphinate-based flame retardant is a compound represented by the following Formula (1).

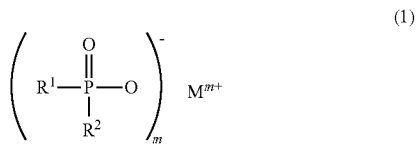

In the above Formula (1), $R^1$ and $R^2$ are each an alkyl group having from 1 to 6 carbon atoms or an aryl group having 12 or less carbon atoms, M is calcium (Ca), aluminum (Al), or zinc (Zn), and when M is aluminum, m is 3, and when M is calcium or zinc, m is 2.

Examples of commercially available metal phosphinate-based flame retardants include aluminum salts of organic phosphinic acid such as trade name "Exolit OP-1230" available from Clariant Chemicals Co., Ltd. The metal phosphinate-based flame retardant may be used alone or in combination of two or more types thereof.

In the flame retardant low hardness material, the blended amount of the metal phosphinate-based flame retardant per 100 parts by mass of the styrene-based elastomer is from 200 to 494 parts by mass, and preferably from 245 to 494 parts by mass.

In the flame retardant low hardness material, the ratio (a/(b1+b2)) of the mass (a) of the process oil to the total mass (b1+b2) of the mass (b1) of the melamine polyphosphate-based flame retardant and the mass (b2) of the metal phosphinate-based flame retardant is not particularly limited as long as the present technology is not impaired, but is, for example, preferably 0.70 or greater, and more preferably 0.79 or greater. When the range of the ratio is within such a range, low hardness of the flame retardant low hardness material is ensured while flame retardancy is achieved.

The fluorine-based resin is added to the flame retardant low hardness material together with the melamine polyphosphate-based flame retardant, the metal phosphinate-based flame retardant, and the carbon filler, and has a function of improving flame retardancy of the flame retardant low hardness material, for example. Further, the fluorine-based resin has a function as an anti-drip agent. Examples of the fluorine-based resin include polytetrafluoroethylene (PTFE), polyvinylidene fluoride (PVDF), polyvinyl fluoride (PVF), and polytetrafluoroethylene-hexylfluoropropylene copolymer (FEP).

The fluorine-based resin is preferably acrylic-modified PTFE from the perspective of dispersibility and affinity with the styrene-based elastomer, and the like.

As the acrylic-modified PTFE, a synthesized product or a commercially available product may be used. As a method for synthesizing the acrylic-modified PTFE, for example, a latex blending method using an aqueous dispersion of PTFE and an aqueous dispersion of an acrylic resin can be exemplified.

Examples of commercially available acrylic-modified PTFE include METABLEN (registered trademark) A-3000, METABLEN A-3700, METABLEN A-3750, and METABLEN A-3800 (all are trade names, available from Mitsubishi Chemical Corporation). The fluorine-based resin may be used alone or in combination of two or more types thereof.

In the flame retardant low hardness material, the blended amount of the fluorine-based resin per 100 parts by mass of the styrene-based elastomer is from 4 to 6 parts by mass.

The carbon filler is added to the flame retardant low hardness material together with the melamine polyphosphate-based flame retardant, the metal phosphinate-based flame retardant, and the fluorine-based resin, and has a function of improving flame retardancy of the flame retardant low hardness material, for example. Examples of the carbon filler include carbon black, graphite, and fullerene, and carbon black is preferable.

The average primary particle size of the carbon filler such as carbon black is preferably from 10 nm to 30 nm, preferably 12 nm or greater, and preferably 25 nm or less. The average primary particle size can be calculated by acquiring an enlarged image of the aggregate by the procedure described in "ASTM D3849-Standard Test Method for Carbon Black-Morphological Characterization of Carbon Black Using Electron Microscopy", then measuring the particle sizes of 3000 particles as a unit constituent particle from the acquired aggregate image, and obtaining the average value.

As the carbon black, for example, trade name "#900" (average primary particle size: 16 nm) available from Mitsubishi Chemical Corporation can be exemplified. The carbon black may be used alone or in combination of two or more types thereof.

In the flame retardant low hardness material, the blended amount of the carbon filler per 100 parts by mass of the styrene-based elastomer is from 56 to 93 parts by mass.

The flame retardant low hardness material of the present embodiment may contain other components such as an antioxidant as necessary in addition to the above components.

The antioxidant used is not particularly limited as long as the present technology is not impaired. Examples thereof include phenol-based agents, organic sulfur-based agents, hindered phenol-based agents, hindered amine-based agents, organic phosphorus hindered phenol-based agents, and amine-based agents. As the antioxidant, a phenol-based antioxidant is preferable. Examples of the phenol-based antioxidant include pentaerytriyltetrakis-3-(3,5-di-tert-butyl-4-hydroxyphenyl)propionate (trade name "SONGNOX 1010", available from SONGWON Industrial). The antioxidant may be used alone or in combination of two or more types thereof.

In the flame retardant low hardness material, the blended amount of the antioxidant per 100 parts by mass of the styrene-based elastomer is preferably from 7 to 11 parts by mass.

In the flame retardant low hardness material of the present embodiment, other components such as a coloring agent (pigment, dye, for example), a filler, an ultraviolet absorber, a plasticizer, a preservative, and a solvent may be added in addition to the above antioxidant, as long as the present technology is not impaired.

The flame retardant low hardness material is composed of a material obtained by forming a composition containing the above components (a styrene-based elastomer, a process oil, a melamine polyphosphate-based flame retardant, a metal phosphinate-based flame retardant, a fluorine-based resin, and a carbon filler, and the like) in a predetermined shape. A method for forming the flame retardant low hardness material is not particularly limited as long as it is a general forming method for a thermoplastic elastomer (for example, styrene-based elastomer). Examples thereof include injection molding using a predetermined mold, and sheet forming using a press or a T-die.

In the flame retardant low hardness material, the Asker C hardness based on the standard of the Society of Rubber Science and Technology, Japan (SRIS 0101) is 30 or less, and preferably 20 or less.

Also, the flame retardant low hardness material is utilized for, for example, measures against vibration and impact in electronic devices such as hard disk drives, cameras, projectors, and other devices. In particular, the flame retardant low hardness material is excellent in a function of reducing transmission vibration by reflecting vibration waves (vibration isolation properties). Disposing such a flame retardant low hardness material between a vibration source and a vibrated source enables to reduce the vibration transmissibility between them, and thus blocks vibration. The vibration isolation properties of the flame retardant low hardness material are evaluated by the method described below.

Further, the flame retardant low hardness material is excellent in flame retardancy. The flame retardancy of the flame retardant low hardness material is evaluated based on the vertical flame test in accordance with the UL94V standard described below.

EXAMPLES

Hereinafter, the present technology will be described in more detail based on examples. Note that the present technology is not limited to these examples.

Examples 1 to 20 and Comparative Examples 1 to 4

(Production of Composition)

A process oil (a), a melamine polyphosphate-based flame retardant (b1), a metal phosphinate-based flame retardant (b2), an antioxidant, a fluorine-based resin, carbon black, and the like were blended per 100 parts by mass of a styrene-based elastomer in the proportions (parts by mass) shown in Tables 1 to 3. The mixture thereof was kneaded by using a Labo Plastomill (twin-screw extruder, product name "4C150-1", available from Toyo Seiki Seisakusho) under the conditions of 30 rpm and 180° C. for 3 minutes. Thus, the compositions of Examples 1 to 20 and Comparative Examples 1 to 4 were obtained.

Materials used in Examples and the like are as follows. In the present specification, the average particle size of the filler of the melamine polyphosphate-based flame retardant and the like (excluding the average particle size of the carbon filler such as carbon black) is a volume-based average particle size D50 determined by a laser diffraction method or the like.

"Styrene-based elastomer": SEEPS, trade name "SEPTON 4055", available from Kuraray Co., Ltd.

"Process oil (a)": petroleum-based hydrocarbon, trade name "Diana Process Oil PW-380", available from Idemitsu Kosan Co., Ltd.

"Melamine polyphosphate-based flame retardant (b1)": melamine polyphosphate, trade name "MPP-A", average particle size: 4.0 μm, available from Sanwa Chemical Co., Ltd.

"Metal phosphinate-based flame retardant (b2)": metal phosphinate, trade name "Exorit OP-1230", available from Clariant Chemicals Co., Ltd.

"Antioxidant": phenol-based antioxidant, trade name "SONGNOX 1010", available from SONGWON Industrial "Fluorine-based resin": acrylic-modified polytetra fluoroethylene, trade name "METABLEN A3750", available from Mitsubishi Chemical Corporation "Carbon black": carbon black (an example of the carbon filler), particle size: 16 nm, trade name "#900", available from Mitsubishi Chemical Corporation.

"Magnesium hydroxide": magnesium hydroxide obtained by treating the surface of magnesium hydroxide having an average particle size of about 1 μm with oleic acid, trade name "N-4", available from Konoshima Chemical Co., Ltd.

(Production of Molded Body)

A mold set in a 50 ton-pressing machine (product name "hydraulic molding machine C type", available from Iwaki Industry Co., Ltd) was heated at 180° for 1 minute, and then each of the above compositions was filled in the mold. Subsequently, the mold was heated at 180° C. for 1 minute in a state of being sandwiched by a press (pressurizing condition: about 2 tons). Thereafter, the mold was cooled for 2 minutes in a state of being sandwiched by a cooling press set at normal temperature. Then, a sheet-shaped molded body (160 mm×160 mm×1.5 mm) was released from the cooled mold. Thus, the molded bodies formed from the compositions of Examples 1 to 20 and Comparative Examples 1 to 4 were obtained.

[Evaluation]

The flame retardancy and vibration isolation properties of the molded bodies of Examples and Comparative Examples were evaluated by the methods described below.

(Flame Retardancy)

In each of Examples and the like, a test piece (13 mm×125 mm×1.5 mm) having a predetermined size was cut out from the obtained molded body, and the test piece was subjected to a vertical flame test in accordance with the UL94V standard. Specifically, a test piece was attached vertically to a predetermined clamp, and the test piece was brought into contact with fire having a size of 20 mm for 10 seconds twice. Then, determination of "V-0", "V-1", or "V-2" was performed based on the combustion behavior thereof. Note that a case where there was no flame retardancy was determined as "Poor". The results were shown in Tables 1 to 3.

(Vibration Isolation Properties)

In each of Examples and the like, a test piece (5 mm×5 mm×3 mm) having a predetermined size was cut out from the obtained molded body, and used as a test piece. In each of Examples and the like, four test pieces were prepared. Then, the vibration isolation properties were evaluated for the test pieces in each of Examples by using a vibration testing device 10 described below.

The Drawing is an explanatory diagram schematically illustrating a configuration of the vibration testing device 10. As the vibration testing device 10, "F-300BM/A" (available from EMIC corporation, automatic vibration testing device) was used. The vibration testing device 10 is a device that vibrates a vibration table 11 by generating vibration of a predetermined frequency. The vibration direction is the vertical direction in the Drawing (the thickness direction of a test piece S). The vibration testing device 10 includes a mounting plate 12 and the like, in addition to the vibration table 11. The mounting plate 12 is a square in a plan view, and the mass thereof is set to 400 g. Note that evaluation of the vibration isolation properties using the vibration testing device 10 was performed in a room temperature environment of 23° C.

As illustrated in the Drawing, four test pieces S are respectively disposed at four corners of the mounting plate 12 in a manner that the test pieces are sandwiched between the mounting plate 12 and the vibration table 11. That is, the mounting plate 12 is supported by the test pieces S at four points on the vibration table 11.

In such a state, the vibration table 11 was vibrated under the conditions of an acceleration of 0.4 G, a frequency of 10 Hz to 1000 Hz, and a sweep rate of 458 seconds/sweep. Then, vibration of the mounting plate 12 was detected by an acceleration pickup 13 attached to the mounting plate 12, and the vibration isolation properties (vibration characteristics) was evaluated based on the detection result. The results were shown in Tables 1 to 3.

Note that the resonance frequency (Hz) is a frequency at the peak value (resonance magnification) in a resonance curve (vertical axis: response magnification (dB), horizontal axis: frequency (Hz)) obtained from the detection result of the acceleration pickup 13. Also, the crossover frequency (Hz) is a frequency at the point where the resonance curve intersects with the horizontal axis (response magnification: 0 dB).

TABLE 1

| Material name | Example 1 | Example 2 | Example 3 | Example 4 | Example 5 | Example 6 |
|---|---|---|---|---|---|---|
| Styrene-based elastomer | 100 | 100 | 100 | 100 | 100 | 100 |
| Process oil (a) | 807 | 696 | 733 | 770 | 770 | 770 |
| Melamine polyphosphate-based flame retardant (b1) | 494 | 494 | 494 | 494 | 494 | 494 |
| Metal phosphinate-based flame retardant (b2) | 494 | 494 | 494 | 494 | 494 | 494 |
| Antioxidant | 11 | 11 | 11 | 11 | 11 | 11 |
| Fluorine-based resin | 6 | 6 | 6 | 6 | 6 | 6 |
| Carbon black | 56 | 56 | 56 | 56 | 74 | 93 |
| (a/(b1 + b2)) | 0.82 | 0.70 | 0.74 | 0.78 | 0.78 | 0.78 |
| Hardness (ASKER C) | 13 | 30 | 27 | 21 | 23 | 24 |
| Flame retardancy (UL94) | V-0 | V-0 | V-0 | V-0 | V-0 | V-0 |
| Resonance frequency (Hz) | 38.3 | 56.8 | 53.0 | 46.1 | 51.3 | 51.6 |
| Crossover frequency (Hz) | 64.7 | 101.5 | 93.8 | 79.8 | 88.7 | 88.7 |

| Material name | Example 7 | Example 8 | Example 9 | Example 10 | Example 11 | Example 12 |
|---|---|---|---|---|---|---|
| Styrene-based elastomer | 100 | 100 | 100 | 100 | 100 | 100 |
| Process oil (a) | 789 | 807 | 789 | 807 | 544 | 576 |
| Melamine polyphosphate-based flame retardant (b1) | 494 | 494 | 494 | 494 | 238 | 250 |
| Metal phosphinate-based flame retardant (b2) | 494 | 494 | 494 | 494 | 238 | 250 |
| Antioxidant | 11 | 11 | 11 | 11 | 7 | 8 |
| Fluorine-based resin | 6 | 6 | 6 | 6 | 4 | 4 |
| Carbon black | 74 | 74 | 93 | 93 | 60 | 63 |
| (a/(b1 + b2)) | 0.80 | 0.82 | 0.80 | 0.82 | 1.14 | 1.15 |
| Hardness (ASKER C) | 16 | 15 | 18 | 17 | 25 | 19 |
| Flame retardancy (UL94) | V-0 | V-0 | V-0 | V-0 | V-0 | V-0 |
| Resonance frequency (Hz) | 39.4 | 39.0 | 39.2 | 40.9 | 43.6 | 35.3 |
| Crossover frequency (Hz) | 66.9 | 66.3 | 67.2 | 68.1 | 69.4 | 56.8 |

TABLE 2

| Material name | Example 13 | Example 14 | Example 15 | Example 16 |
|---|---|---|---|---|
| Styrene-based elastomer | 100 | 100 | 100 | 100 |
| Process oil (a) | 550 | 600 | 630 | 576 |
| Melamine polyphosphate-based flame retardant (b1) | 274 | 295 | 307 | 200 |
| Metal phosphinate-based flame retardant (b2) | 274 | 295 | 307 | 200 |
| Antioxidant | 8 | 8 | 9 | 8 |
| Fluorine-based resin | 4 | 4 | 4 | 4 |
| Carbon black | 64 | 68 | 71 | 63 |
| (a/(b1 + b2) | 1.00 | 1.02 | 1.03 | 1.44 |
| Hardness (ASKER C) | 26 | 18 | 16 | 15 |
| Flame retardancy (UL94) | V-0 | V-0 | V-0 | V-2 |
| Resonance frequency (Hz) | 38.9 | 35.4 | 35.1 | 32.1 |
| Crossover frequency (Hz) | 63.2 | 56.8 | 57.4 | 51.6 |

| Material name | Example 17 | Example 18 | Example 19 | Example 20 |
|---|---|---|---|---|
| Styrene-based elastomer | 100 | 100 | 100 | 100 |
| Process oil (a) | 576 | 576 | 576 | 576 |
| Melamine polyphosphate-based flame retardant (b1) | 211 | 230 | 240 | 245 |
| Metal phosphinate-based flame retardant (b2) | 211 | 230 | 240 | 245 |
| Antioxidant | 8 | 8 | 8 | 8 |
| Fluorine-based resin | 4 | 4 | 4 | 4 |
| Carbon black | 63 | 63 | 63 | 63 |
| (a/(b1 + b2) | 1.36 | 1.25 | 1.2 | 1.18 |
| Hardness (ASKER C) | 16 | 17 | 15 | 16 |
| Flame retardancy (UL94) | V-2 | V-2 | V-2 | V-0 |
| Resonance frequency (Hz) | 34.4 | 35.3 | 34.6 | 31.1 |
| Crossover frequency (Hz) | 53.8 | 56.6 | 56.6 | 50.9 |

TABLE 3

| Material name | Comparative Example 1 | Comparative Example 2 | Comparative Example 3 | Comparative Example 4 |
|---|---|---|---|---|
| Styrene-based elastomer | 100 | 100 | 100 | 100 |
| Process oil (a) | 696 | 696 | 750 | 500 |
| Melamine polyphosphate-based flame retardant (b1) | 494 | 494 | 689 | 222 |
| Metal phosphinate-based flame retardant (b2) | 494 | 494 | 689 | 222 |
| Antioxidant | 11 | 11 | 7 | 7 |
| Fluorine-based resin | 6 | 6 | 7 | 3 |
| Carbon black | 0 | 0 | 34 | 56 |
| Magnesium hydroxide | 0 | 56 | 0 | 0 |
| (a/(b1 + b2) | 0.70 | 0.70 | 0.54 | 1.13 |
| Hardness (ASKER C) | 29 | 30 | 37 | 25 |
| Flame retardancy (UL94) | Poor | Poor | V-0 | Poor |
| Resonance frequency (Hz) | 53.0 | 61.5 | 76.6 | 42.0 |
| Crossover frequency (Hz) | 90.0 | 111.4 | 127.1 | 70.7 |

As shown in Tables 1 and 2, it was confirmed that the molded bodies of Examples 1 to 20 were excellent in flame retardancy and vibration isolation properties. Note that in each of the molded bodies (test pieces) of Examples 1 to 20, vibration isolation effect is exhibited in a region with a value of frequency higher than the crossover frequency (Hz). Further, it can be said that a lower value of the resonance frequency (Hz) indicates increase in a region in which the vibration isolation effect is exhibited (frequency region having a value of frequency higher than the crossover frequency).

Comparative Example 1 is a case where carbon black is not contained. It was confirmed that such Comparative Example 1 had no flame retardancy.

Comparative Example 2 is a case where carbon black is not contained and magnesium hydroxide is contained instead. It was confirmed that such Comparative Example 2 also had no flame retardancy.

Comparative Example 3 is a case where the blended amounts of the melamine polyphosphate flame retardant and the metal phosphinate-based flame retardant are too large. It was confirmed that such Comparative Example 3 did not ensure low hardness.

Comparative Example 4 is a case where the blended amount of the fluorine-based resin is too small. It was confirmed that such Comparative Example 4 had no flame retardancy.

Note that, among Examples 1 to 20, Examples 1, 7 to 10, 12, and 14 to 20 are particularly excellent in low hardness, and the Asker C hardness thereof is 20 or less.

Further, Examples 1, 7 to 10, 12, 14, and 15 are excellent in low hardness (Asker C hardness: 20 or less) and flame retardancy (V-0).

The invention claimed is:

1. A flame retardant low hardness material, comprising:
    100 parts by mass of a styrene-based elastomer;
    from 500 to 807 parts by mass of a process oil composed of a petroleum-based hydrocarbon;
    from 200 to 494 parts by mass of a melamine polyphosphate-based flame retardant;
    from 200 to 494 parts by mass of a metal phosphinate-based flame retardant;
    from 4 to 6 parts by mass of a fluorine-based resin; and
    from 56 to 93 parts by mass of a carbon filler, wherein an asker C hardness is 30 or less.

2. The flame retardant low hardness material according to claim 1, wherein
    a content of the process oil is from 576 to 807 parts by mass;
    a ratio (a/(b1+b2)) of a mass (a) of the process oil to a total mass (b1+b2) of the melamine polyphosphate-based flame retardant and the metal phosphinate-based flame retardant is 0.79 or greater;
    the asker C hardness is 20 or less; and
    a mass (b1) indicates a mass of the melamine polyphosphate-based flame retardant and a mass (b2) indicates a mass of the metal phosphinate-based flame retardant.

3. The flame retardant low hardness material according to claim 2, wherein
    a content of the melamine polyphosphate-based flame retardant is from 245 to 494 parts by mass; and
    a content of the metal phosphinate-based flame retardant is from 245 to 494 parts by mass.

4. The flame retardant low hardness material according to claim 1, wherein
    a content of the melamine polyphosphate-based flame retardant is from 245 to 494 parts by mass; and
    a content of the metal phosphinate-based flame retardant is from 245 to 494 parts by mass.

* * * * *